(12) United States Patent
Gachignard

(10) Patent No.: US 8,264,523 B2
(45) Date of Patent: Sep. 11, 2012

(54) DEVICE FOR A VIDEOCONFERENCE COMMUNICATION AND ASSOCIATED COMMUNICATION METHOD

(75) Inventor: Olivier Gachignard, Montrouge (FR)

(73) Assignee: France Telecom, Paris (FR)

( * ) Notice: Subject to any disclaimer, the term of this patent is extended or adjusted under 35 U.S.C. 154(b) by 515 days.

(21) Appl. No.: 12/448,413

(22) PCT Filed: Dec. 6, 2007

(86) PCT No.: PCT/FR2007/052454
§ 371 (c)(1),
(2), (4) Date: Jun. 19, 2009

(87) PCT Pub. No.: WO2008/081131
PCT Pub. Date: Jul. 10, 2008

(65) Prior Publication Data
US 2010/0091088 A1  Apr. 15, 2010

(30) Foreign Application Priority Data

Dec. 22, 2006  (FR) ...................................... 06 11293

(51) Int. Cl.
*H04N 7/14* (2006.01)
(52) U.S. Cl. ................ 348/14.16; 348/14.01; 348/14.08
(58) Field of Classification Search ..... 348/14.01–14.16
See application file for complete search history.

(56) References Cited

U.S. PATENT DOCUMENTS 5,500,671 A * 3/1996 Andersson et al. .......... 348/14.1
2006/0126894 A1 * 6/2006 Mori ............................ 382/103

FOREIGN PATENT DOCUMENTS

| EP | 1 211 869 | | 6/2002 |
|---|---|---|---|
| EP | 1458182 A1 | * | 9/2004 |
| EP | 1489550 A2 | * | 12/2004 |
| FR | 2 858 431 | | 2/2005 |

OTHER PUBLICATIONS

Rose et al., "A review of eye-to-eye videoconferencing techniques", BT Technology Journal, vol. 13, No. 4, Oct. 1995.

* cited by examiner

*Primary Examiner* — Melur Ramakrishnaiah
(74) *Attorney, Agent, or Firm* — McKenna Long & Aldridge LLP

(57) ABSTRACT

The invention relates to a device (1) for a videoconference communication between a local user (5) and at least one remote user (6), which reduces the eye deflection and provides a better eye contact between the local user and the remote user. The device includes a screen (4) capable of restoring, for the local user, an image of the remote user, and an image sensor (3) capable of sensing an image of the local user for the remote user. It further comprises a light source (2) arranged, relative to the image sensor, so as to lighten the eyes of the local user watching the screen during a communication with the remote user, so that the image sensor can detect an image of the local user including a reflection of the light source on a portion at least of each eye of the local user, including the pupil. The device further includes communication means (7) capable of transmitting the detected image to the remote user (6).

12 Claims, 4 Drawing Sheets

DEVICE FOR A VIDEOCONFERENCE COMMUNICATION AND ASSOCIATED COMMUNICATION METHOD

This application claims the benefit of PCT/FR2007/052454 filed on Dec. 6, 2007, and French Application No. 0611293 filed on Dec. 22, 2006, the contents of which are hereby incorporated herein by reference for all purposes in their entirety.

BACKGROUND OF THE INVENTION

The present invention relates to videoconference communications.

A videoconference allows at least two users to communicate with each other, not only by voice but also visually. Each user can in fact obtain an image of the other user(s) involved in the communication.

To this end, each user can have a screen which reproduces the image of the other user(s) involved in the communication, as well as an image sensor more or less close to the screen and capable of picking up his own image for viewing by the other user(s).

A problem with videoconferencing lies in the fact that users see the image of the other user(s) on their screen, rather than that of the image sensor. The resulting impression is that the various users are not making eye contact. This effect is sometimes called the "two-faced" effect. This prevents high-quality communication between participants.

Several solutions have been proposed to resolve this problem.

According to a first solution, screens comprising a hole in which the image sensor is placed have been envisaged. However, such a hole creates a break in the image displayed.

According to a second solution, a semi-reflective pane is placed in front of the screen of a local user at a certain angle, in order to reflect the image of the local user toward an image sensor, while allowing the remote user image displayed on the screen to pass through.

A third solution, described in particular in FR 2,858,431, uses a fast-switching transflective screen. A screen of this type alternates at a high frequency between an opaque state and a transparent state. Suitably positioned, the image sensor can then pick up the image of a local user when the screen is in its transparent state. Moreover, when the screen is in its transparent state, it can reproduce for the local user an image of the remote user with whom he is in communication.

Despite the improvement in the quality of communication contributed by these different solutions of the prior art, nevertheless they require complex and costly systems, the use of which may be suitable for companies but is not appropriate in terms of the public in general.

A videoconference system is also known from U.S. Pat. No. 5,500,671 which makes it possible to correct the parallax effect resulting from the angular separation between the camera and the image viewed on the screen. This system comprises in particular a light source projected onto a local user. The image showing the reflection of the light source projected onto the local user is subsequently analysed, then corrected, before being transmitted to the remote user. The drawback of such a system lies in the fact that it requires a complex process of image analysis and processing.

A purpose of the present invention is to make it possible to limit at least some of the above-mentioned drawbacks.

SUMMARY OF THE INVENTION

The invention thus relates to a device for allowing a videoconference communication between a local user and at least one remote user. This device comprises a screen capable of reproducing an image of the remote user for the local user, an image sensor capable of picking up an image of the local user for viewing by the remote user, and a light source arranged in order to illuminate the eyes of the local user viewing the screen during a communication with the remote user. The light source is moreover arranged in relation to the image sensor so that the image sensor can pick up an image of the local user having a reflection of the light source on at least a part of each eye of the local user, including the pupil. The device comprises moreover means of communication capable of transmitting said captured image to the remote user.

Such an illumination of the eyes of the local user using the light source makes it possible to tone down the contours of the pupils and optionally all or part of the iris and thus to soften the perceived directivity of view of the user. In this way, the remote user can obtain an image of the local user which appears to "look him in the eye".

In other words, the above-mentioned device reduces the deflection of the view and provides improved eye contact between the local user and the remote user.

This device is particularly simple and can be adapted to any system (television set, personal computer, etc), whether used for work purposes or by the general public.

According to advantageous embodiments of the invention which can be combined in any imaginable manner:
  the light source is arranged in order to illuminate both eyes of the local user in a substantially identical fashion;
  the light source is arranged so as not to dazzle the local user;
  the light source comprises a lighting unit having a length and/or light intensity dependent on the size of the screen;
  the light source includes the image sensor;
  the light intensity and/or arrangement (position, directivity of the light beam, etc.) of the light source are chosen so that said at least part of each eye of the local user on which the light source is reflected is less than the total surface of the eye.
  the image sensor comprises an offset optic directed towards the eyes of the local user.
  the device comprises moreover means for controlling the light source, capable of taking into account a position of the local user.
  the control means of the light source are arranged so as to adapt the arrangement of the light source according to the position of the local user in relation to the image sensor so as to pick up an image of the local user having a reflection of the light source on at least a part of each eye of the local user, including the pupil.
  the control means of the light source are arranged so as to adapt the light intensity of the light source according to the position of the local user in relation to the image sensor.

According to other advantageous embodiments of the invention:
  the light source is arranged close to the image sensor;
  the image sensor is arranged close to the screen;
  the image sensor is just above or below the screen;
  the light source comprises a lighting unit;
  the lighting unit is a luminescent tube;
  the lighting unit extends over at least a part of the width of the screen;

The invention moreover proposes a method of communication by videoconference between a local user and at least one remote user, the local user being provided with a device comprising a screen capable of reproducing an image of the remote user for the local user, an image sensor capable of picking up an image of the local user for viewing by the remote user, and a light source. According to this method, light illuminates the eyes of the local user during a communication with the remote user using the light source of said device, so that the image sensor can pick up an image of the local user having a reflection of the light source on a part at least of each eye of the local user, including the pupil, then the image captured in this way is transmitted to the remote user using the means of communication.

Advantageously, the remote user is provided with another device comprising a screen capable of reproducing an image of the local user for the remote user, an image sensor capable of picking up an image of the distant user for viewing by the local user, and a light source, said other device being capable of communicating with the local user's device using means of communication. Light illuminates the eyes of the remote user during said communication using the light source of said other device, so that the image sensor of said other device can pick up an image of the remote user having a reflection of the light source of said other device on a part at least of each eye of the remote user, including the pupil.

The present invention also proposes a screen, an image sensor and a light source which are independent of each other, but which are capable of being assembled in order to obtain a device as mentioned above.

In particular, the invention proposes a lighting device comprising an image sensor intended to be used in a device for allowing a videoconference communication between a local user and at least one remote user, said sensor being capable of picking up an image of the local user for viewing by the remote user, and a light source arranged to illuminate the eyes of the local user. The light source is arranged with respect to the image sensor so that the image sensor can pick up an image of the local user having a reflection of the light source on at least a part of each eye of the local user, including the pupil, said image captured in this way being intended for transmission to the remote user.

In particular, the light source can be adapted, in terms of arrangement (for example position, directivity of the light beam, etc) and/or light intensity particularly, according to the position of the local user.

The present invention also proposes a method of assembling a screen, an image sensor and a light source in order to obtain a device as mentioned above.

DESCRIPTION OF PREFERRED EMBODIMENTS

Figure 1:
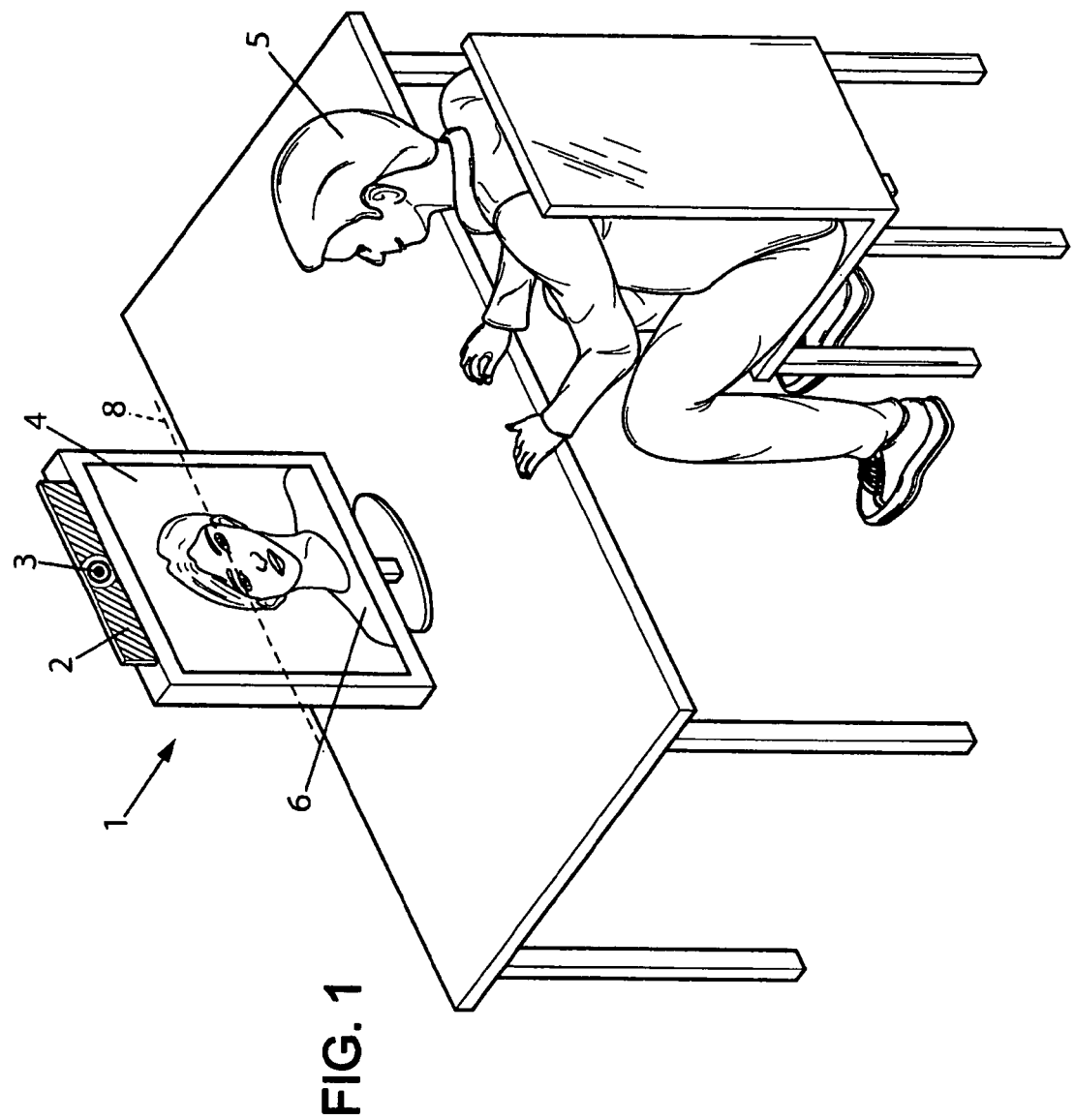
FIG. 1 is a diagram showing an example of a device for allowing a videoconference communication according to the invention.

FIG. 1 shows a device 1 for allowing a videoconference communication between a local user 5 and a remote user 6. In a variant, the videoconference communication could take place between the local user 5 and several remote users.

The device 1 comprises a screen 4 capable of reproducing an image of the remote user 6 for the local user 5. It further comprises an image sensor 3, capable of picking up an image of the local user 5 for viewing by the user 6.

The image sensor 3 can be for example a camera or camera lens. Thus the term "camera" will be used in the following description to denote the image sensor, without constituting any limitation. By way of example, the camera can consist of a webcam.

Moreover, in order to reduce the "two-faced" effect, the device 1 comprises a light source 2 which is arranged to illuminate the eyes of the local user 5 when the latter views the screen 4 during a communication with the remote user 6, so that the image sensor 3 can pick up an image of the local user 5 having a reflection of the light source 2 on a part at least of each eye of the local user 5, including the pupil.

For example, the light source 2 can be placed close to the camera 3.

In a variant, several light sources could be used.

The screen 4 of the device 1 can for example be that of a television set or even a personal computer. A video projection screen can also be used, or any other means capable of reproducing the image of the remote user 6.

Depending on the type of screen 4, it will be understood that the device 1 can be of different types. It can for example constitute or form part of a television set, a personal computer, a complex video projection system, etc.

The camera 3 is preferably arranged close to the screen 4. For example, as shown in FIG. 1, the camera 3 can be placed just above the screen 4, on which, optionally, it can be supported. In a variant, the camera 3 could be placed just below the screen 4. Moreover it is advantageously situated on a vertical median axis of the screen 4, in order to pick up a substantially symmetrical image of the user 5.

According to another construction, the camera 3 could be placed close to one of the vertical frames of the screen 4, if an oblique camera shot of the local user 5 is required.

In all cases, the camera 3 can be fixed to the screen 4 in a permanent or detachable fashion.

Figure 2A:
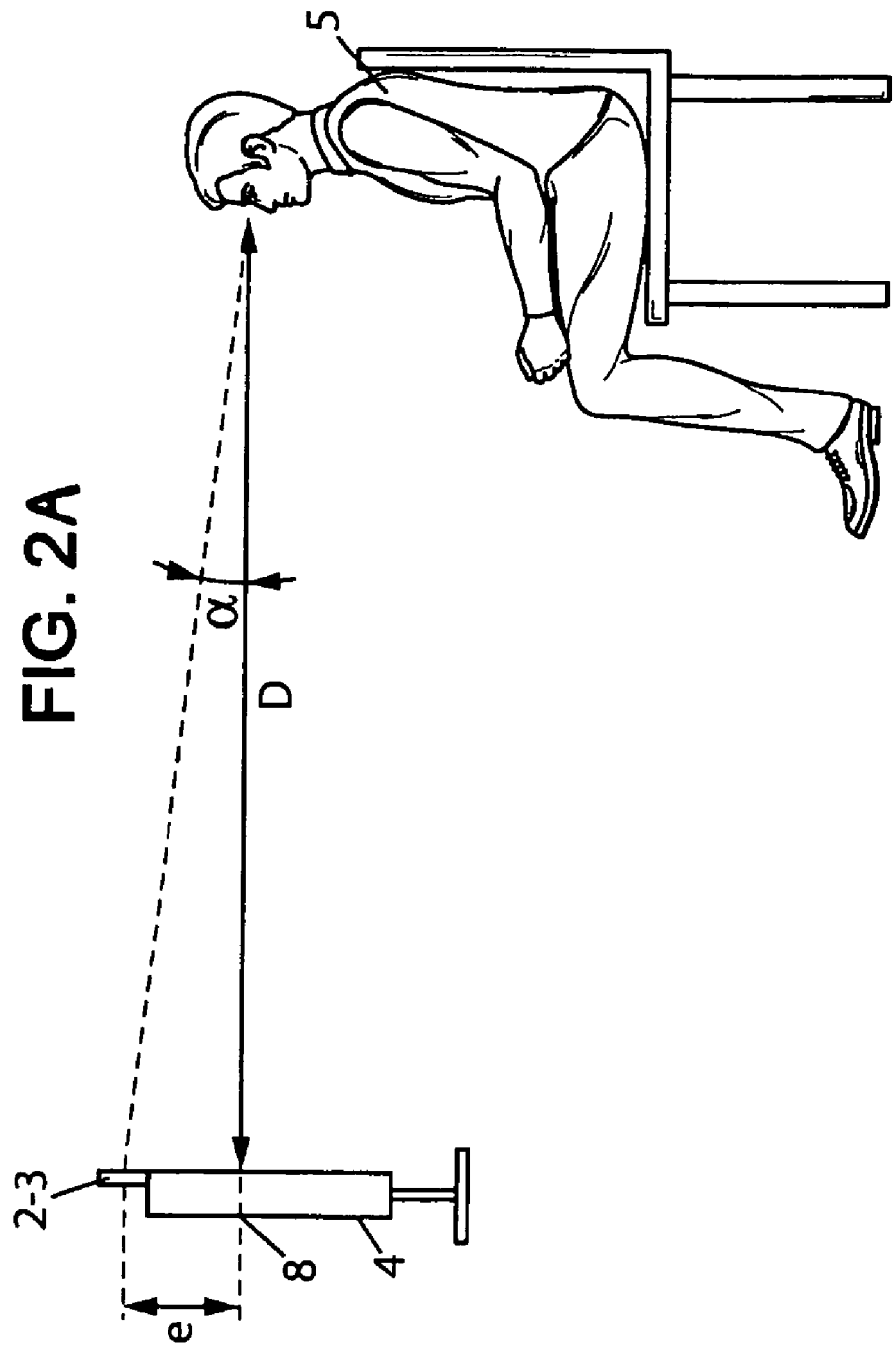
FIG. 2A is a diagram showing certain measurements involved in an example of a device according to the invention.

As can be seen with reference to FIG. 2A, due to the fact that the distance e between the camera 3 and the horizontal axis 8 along which the eyes of the remote user 6 views the screen 4, there is an angular separation α between the zone viewed by the user on the screen 4 and the position of the camera 3. This angle α depends, moreover, on the distance D between the local user 5 and the screen 4. The greater the distance is, the larger the angular separation α and the more marked the "two-faced" effect. Conversely, the greater the distance D is, the smaller the angular separation α and the more the remote user 6 will have the impression that the local user 5 is "looking him in the eye".

By illuminating the eyes of the local user viewing the screen 4, use of the light source 2 makes it possible to correct the angular separation α by taking advantage of the properties of the human eye. In fact, illuminating the eyes of the user 5 tends to mask the contours of his pupils and possibly, all or part of his irises, which are the anatomical elements which accurately indicate the direction of view. In this way, the image picked up by the camera 3 does not allow accurate determination of the zone most particularly viewed by the local user 5.

On the other hand, illuminating the eyes of the local user 5 using the light source 2 so that viewed from the image sensor 3, it imparts a reflection on a part at least of each eye of the local user 5, including the pupil, which gives the impression that the local user 5 is looking into this image sensor 3.

The limitation of the "two-faced" effect thus obtained is particularly significant when the light source 2 is close to the camera 3. Thus the light source 2 is arranged on both sides of the camera 3 in the example shown in FIG. 1. In a variant, the light source 2 could completely surround the camera 3 (or its lens). This could involve for example a rectangle of light surrounding the camera 3. Of course, it is nevertheless not excluded that the light source 2 is not in direct contact with the camera 3.

The light source 2 is advantageously arranged in order to illuminate both eyes of the local user 5 in a substantially identical fashion. Thus a situation is avoided where an image of the user 5 would be picked up in which only one eye of the user 5 would give information on the direction of view of this user. To this end, the light source 2 is advantageously situated in a substantially symmetrical fashion with respect to a vertical median axis of the screen 4, as is the case in the example shown in FIG. 1.

The light source 2 is advantageously arranged so as not to dazzle the local user 5, without which there would be a loss of communication quality, as the user 5 would not be able to gain a clear view on the screen 4 of the user 6 with whom he is in communication. To this end, the shape and/or light intensity of the light source 2 can be suitably adjusted. Thus a light source in the form of a light strip could be preferred to a more dazzling single-point source.

The light source 2 can for example comprise a light unit. This light unit can optionally extend over a part at least of the width of the screen 4, as in the example shown in FIG. 1. This arrangement has the benefit of being able to illuminate both eyes of the user 5, even if the latter is not exactly in the centre with respect to the median vertical plane of the screen 4.

Advantageously, the light source has a length and/or light intensity dependent on the size of the screen 4. It can in fact be envisaged that the variables e and D, and thus the angular separation α, vary depending on the size of the screen.

By way of illustration, the lighting unit can be a luminescent tube, in which case its length greatly exceeds its height.

Advantageously, the light intensity and/or arrangement (for example the position, the directivity of the light beam, etc.) of the light source 2 are chosen according to certain predetermined criteria. These criteria can comprise the fact that the part of each eye of the local user 5 on which the light source is reflected is less than the total surface of the eye. This can for example involve the pupil only, or even the pupil and a part at least of the iris, but not the white of the eye.

The light source 2 can even be controlled by control means, for example in order to change its arrangement (for example its position, the directivity of its light beam, etc.) and/or its light intensity according to a position of the local user 5, optionally with respect to the image sensor 3. In this way, it is possible to retain the capability according to which the image sensor 3 can pick up an image of the local user 5 having a reflection of the light source 2 on a part at least of each eye of the local user 5, including the pupil, even when the local user moves in relation to the image sensor 3.

Such control means can be manual or automated. The position of the local user 5 can be provided to the control means directly by the local user 5, or it can be detected. This detection can be carried out by the control means themselves, by the image sensor 3, by the light source 2 and/or by an independent detector.

In a particular non-limitative embodiment of the invention, the camera 3 comprises an optic which is off centre in the direction of the eyes of the local user. In other words, even if the optic of the camera 3 has a main axis which is substantially orthogonal to the plane formed by the screen 4, i.e. in general an axis close to horizontal, the camera tends to pick up an image along a main axis directed towards the eyes of the local user 5, i.e. downward in the example shown in FIG. 1.

This method of operation makes it possible to correct the perspective effect linked to high-angle or low-angle shots due to the fact that the camera 3 is not situated exactly opposite the eyes of the user 5.

In the non-limitative example described with reference to FIG. 2A, the screen 4 is a television screen situated at a distance D from the user 5 equal to 2.5 meters. At the top of this screen 4 a light unit 2 is arranged surrounding the camera 3 (or its lens), so that this unit 2-3 is at a distance e equal to 30 centimetres from the horizontal axis 8 corresponding to the position of the eyes of the local user 5 on the screen 4.

In this example, the angular separation α corrected by illuminating the eyes of the user 5 is equal to approximately 6.8 degrees (=Arctan(0.3/2.5)).

In such a configuration, a quite narrow light unit 2, such as a luminescent tube approximately 15 centimeters in length and having a light intensity of 500 cd/m$^2$, can be suitable in order to provide the desired correction without dazzling the user 5, when the latter is illuminated overall with an illumination of a minimum of 1000 lux using a light source independent of the light unit 2.

Tests have shown that the "two-faced" effects were largely limited, even eliminated, with the above-mentioned numerical hypotheses.

Of course, the device can be adapted to other types of configuration. For example, certain features of the unit 2-3 can be modified because the screen 4 is no longer that of a television set, but of a personal computer of smaller size, and the distance D between the user 5 and the screen 4 is therefore smaller. In this case, the light unit 2 will advantageously be smaller and will have a lower light output than in the case previously described.

Figure 2B:
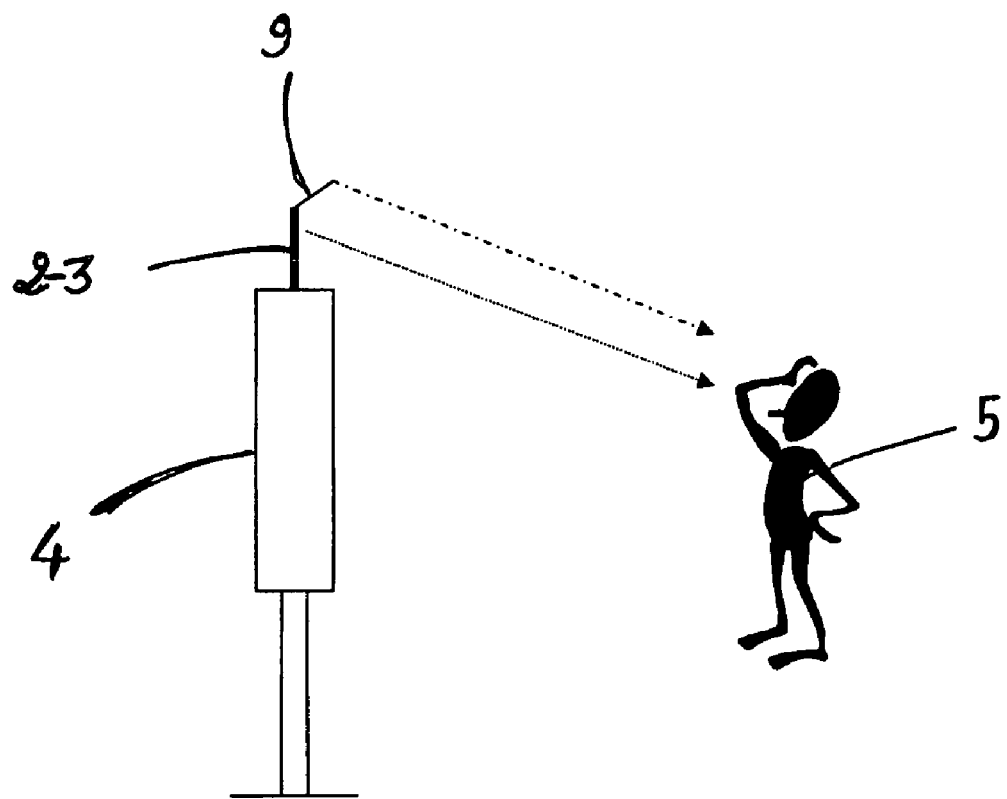
FIG. 2B is a diagram showing an example of a device according to the invention particularly suitable for reducing dazzle for the local user.

In another non-limitative example described with reference to FIG. 2B, the screen 4 is a video projection screen. At the top of this screen 4 a light unit 2 is arranged surrounding the camera 3 (or its lens). In order to ensure optimum efficiency, the unit 2-3 is surmounted by a reflective cowl 9, the angle of which in relation to the unit 2-3 is defined by the position of the eyes of the local user 5 in relation to the light unit 2. The local user 5 is preferably placed at 1 meter from the light unit 2 so that his eyes receive illumination which is equal to a minimum of 500 lux. Such an illumination cannot exceed 800 lux, in order to avoid dazzling the local user 5.

In the light of the above, it is understood that the invention comprises a combination of a screen, an image sensor and a light source. These three elements can be permanently combined with each other, or can be separable from each other.

The device described above can be used to allow the local user 5 to communicate by videoconference with the remote user 6. To this end, the light source 2 is activated to illuminate the eyes of the user 5 during his communication with the user 6, so that the image sensor 3 can pick up an image of the local user having a reflection of the light source 2 on at least a part of each eye of the local user 5, including the pupil.

Figure 3:
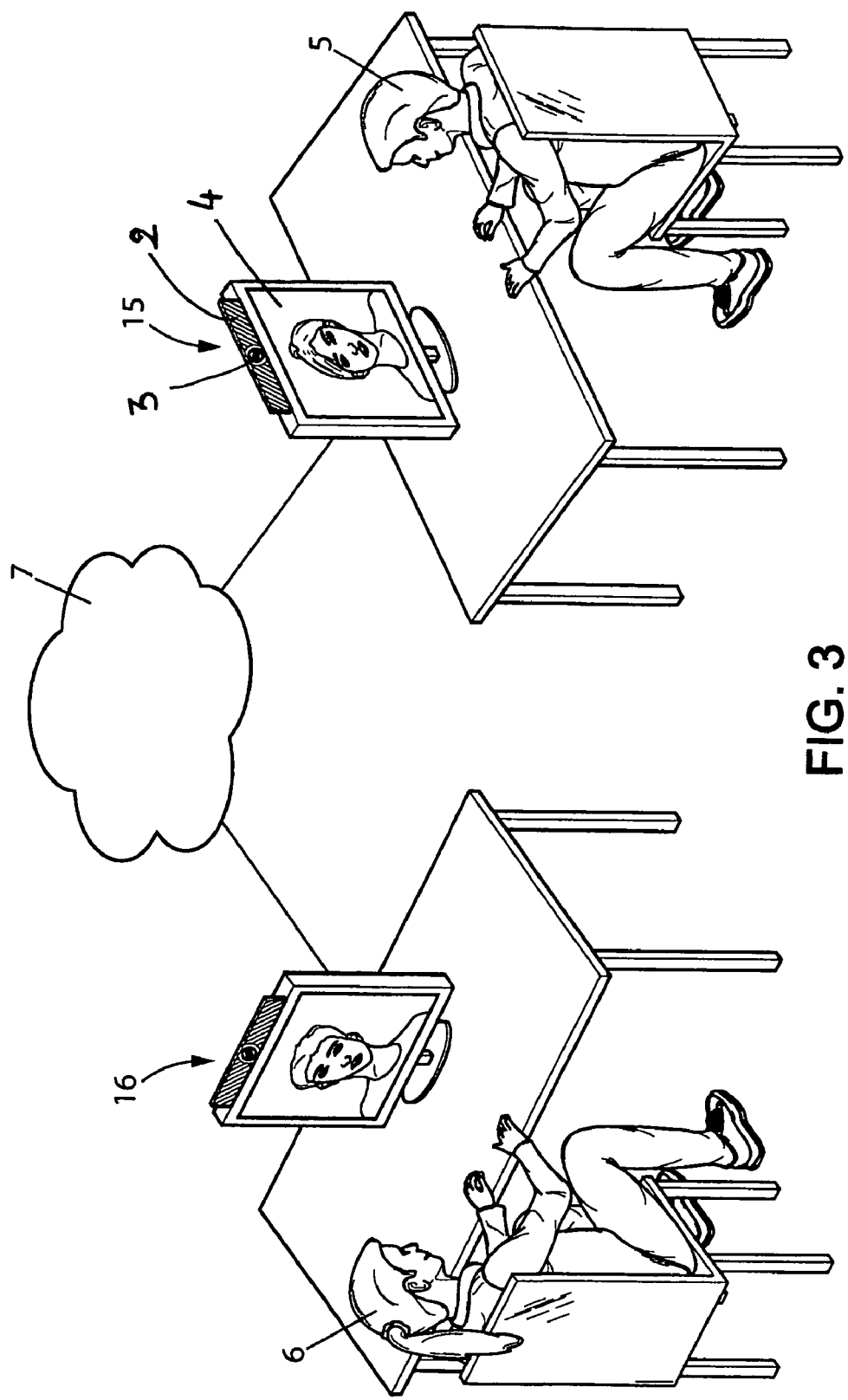
FIG. 3 is a diagram showing an example of videoconference communication between two users.

FIG. 3 shows a communication between a user 5 and a user 6, each provided with a device 15 or 16 respectively, according to the description above.

To this end, means of communication are provided to allow the devices 15 and 16 to intercommunicate, in particular in order to convey the images of the users picked up by their respective cameras, as well as the voices of these users. These means of communication can for example comprise a communications network 7 linking these devices 15 and 16 or systems incorporating these devices, such as personal computers of the users 5 and 6 respectively. This communications network 7 can be of different types. It can for example involve a data transmission network, such as an Internet-type network.

The invention claimed is:

1. A device for allowing a videoconference communication between a local user and at least one remote user comprising:
a screen capable of reproducing an image of the remote user for the local user,
an image sensor capable of picking up an image of the local user for viewing by the remote user,
a light source arranged to illuminate the eyes of the local user viewing the screen during a communication with the remote user, the light source being arranged with respect to the image sensor so that the image sensor can pick up an image of the local user having a reflection of the light source on a part at least of each eye of the local user, including the pupil, and
means of communication capable of transmitting said captured image to the remote user.

2. The device according to claim 1, in which the light source is arranged to illuminate both eyes of the local user in a substantially identical fashion.

3. The device according to claim 1, in which the light source is arranged in order not to dazzle the local user.

4. The device according to claim 1, in which the light source comprises a light unit having a length and/or a light intensity dependent on the size of the screen.

5. The device according to claim 1, in which the light source encompasses the image sensor.

6. The device according to claim 1, in which the light intensity and/or the arrangement of the light source are chosen so that said at least part of each eye of the local user on which the light source is reflected is less than the total surface of the eye.

7. The device according claim 1, in which the image sensor comprises an offset optic directed towards the eyes of the local user.

8. The device according to claim 1, the device comprising moreover means for controlling the light source, capable of taking into account a position of the local user.

9. The device according to claim 8, in which the control means of the light source are arranged so as to adapt the arrangement of the light source according to the position of the local user in relation to the image sensor, so that the image sensor can pick up an image of the local user having a reflection of the light source on at least a part of each eye of the local user, including the pupil.

10. The device according to claim 8, in which the control means of the light source are arranged so as to adapt the light intensity of the light source according to the position of the local user in relation to the image sensor.

11. A lighting device comprising:
an image sensor intended to be used in a device for allowing a videoconference communication between a local user and at least one remote user, said sensor being capable of picking up an image of the local user for viewing by the remote user,
a light source arranged in order to illuminate the eyes of the local user, the light source being arranged with respect to the image sensor so that the image sensor can pick up an image of the local user having a reflection of the light source on a part at least of each eye of the local user, including the pupil, said image captured in this way being intended for transmission to the remote user.

12. A method of communication by videoconference between a local user and at least one remote user, the local user being provided with a device comprising a screen capable of reproducing an image of the remote user for the local user, an image sensor capable of picking up an image of the local user for viewing by the remote user, and a light source in which:
light illuminates the eyes of the local user during a communication with the remote user using the light source of said device, so that the image sensor can pick up an image of the local user having a reflection of the light source on a part at least of each eye of the local user, including the pupil, then
the image captured in this way is transmitted to the remote user using the means of communication.

* * * * *